(12) United States Patent
Kim et al.

(10) Patent No.: US 10,312,482 B2
(45) Date of Patent: Jun. 4, 2019

(54) BATTERY PACK HAVING ELECTRIC INSULATING MEMBER

(71) Applicant: LG CHEM, LTD., Seoul (KR)

(72) Inventors: Han Chul Kim, Daejeon (KR); Young Bum Cho, Daejeon (KR); Ho Chol Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 482 days.

(21) Appl. No.: 15/024,617

(22) PCT Filed: Jul. 16, 2014

(86) PCT No.: PCT/KR2014/006415
§ 371 (c)(1),
(2) Date: Mar. 24, 2016

(87) PCT Pub. No.: WO2015/046725
PCT Pub. Date: Apr. 2, 2015

(65) Prior Publication Data
US 2016/0211493 A1 Jul. 21, 2016

(30) Foreign Application Priority Data

Sep. 30, 2013 (KR) .................. 10-2013-0116641

(51) Int. Cl.
*H01M 2/10* (2006.01)
*H01M 10/04* (2006.01)
(Continued)

(52) U.S. Cl.
CPC ....... *H01M 2/1061* (2013.01); *H01M 2/0212* (2013.01); *H01M 2/0277* (2013.01);
(Continued)

(58) Field of Classification Search
CPC ............ H01M 2/1061; H01M 2/0212; H01M 2/0277; H01M 2/0275; H01M 10/0463; H01M 10/0525; H01M 10/425
See application file for complete search history.

(56) References Cited

U.S. PATENT DOCUMENTS

2003/0146734 A1* 8/2003 Kozu .................. H01M 2/021
320/107
2003/0180582 A1 9/2003 Masumoto et al.
(Continued)

FOREIGN PATENT DOCUMENTS

| CN | 101103473 A | 1/2008 |
| CN | 102916154 A | 2/2013 |

(Continued)

OTHER PUBLICATIONS

Kawahara, JP 2013-080569 English Translation "Battery Pace", Publication May 2, 2013 (Year: 2013).*
(Continued)

*Primary Examiner* — Jimmy Vo
(74) *Attorney, Agent, or Firm* — Birch, Stewart, Kolasch & Birch, LLP

(57) ABSTRACT

Disclosed herein is a battery pack including two or more plate-shaped battery cells arranged in plane such that electrode terminals of the battery cells are aligned in one direction, a pack frame including two or more battery cell receiving parts surrounding outer circumferences of the battery cells in a state in which upper and lower surfaces of the battery cells arranged in plane are opened, a pack frame including a receiving part to receive the two or more plate-shaped battery cells, the receiving part surrounding outer circumferences of the battery cells in a state in which upper and lower surfaces of the battery cells arranged in plane are opened, a protection circuit module (PCM) electrically connected to the electrode terminals to control (Continued)

operation of the battery pack, a middle mold to receive the PCM, the middle mold being loaded on the sealed surplus portions, an electrically insulative member applied into a space defined by the sealed surplus portions and the pack frame and onto the middle mold and the PCM, and a label to cover the battery cells, the pack frame, and the electrically insulative member.

25 Claims, 9 Drawing Sheets

(51) Int. Cl.
*H01M 10/42* (2006.01)
*H01M 2/02* (2006.01)
*H01M 10/0525* (2010.01)

(52) U.S. Cl.
CPC ... *H01M 10/0463* (2013.01); *H01M 10/0525* (2013.01); *H01M 10/425* (2013.01); *H01M 2/0275* (2013.01); *H01M 2200/00* (2013.01); *H01M 2220/30* (2013.01)

(56) References Cited

U.S. PATENT DOCUMENTS

| | | |
|---|---|---|
| 2006/0035141 A1 | 2/2006 | Lee |
| 2006/0199075 A1 | 9/2006 | Moon et al. |
| 2009/0202912 A1 | 8/2009 | Baba et al. |
| 2013/0034750 A1 | 2/2013 | Choi et al. |
| 2013/0330575 A1* | 12/2013 | Baek ............ H01M 2/0212 429/7 |
| 2014/0147707 A1 | 5/2014 | Choi et al. |

FOREIGN PATENT DOCUMENTS

| | | |
|---|---|---|
| CN | 202721220 U | 2/2013 |
| CN | 203218397 U | 9/2013 |
| EP | 2 058 892 A1 | 5/2009 |
| EP | 2 725 639 A2 | 4/2014 |
| JP | 2004-356027 A | 12/2004 |
| JP | 2006-172882 A | 6/2006 |
| JP | 2008-527678 A | 7/2008 |
| JP | 2012-113973 A | 6/2012 |
| JP | 2013-38064 A | 2/2013 |
| JP | 2013-80569 A | 5/2013 |
| JP | 2014-78497 A | 5/2014 |
| KR | 10-2004-0014990 A | 2/2004 |
| KR | 10-2006-0084888 A | 7/2006 |
| KR | 10-2008-0036738 A | 4/2008 |
| KR | 10-2010-0082678 A | 7/2010 |
| KR | 10-2013-0030285 A | 3/2013 |
| TW | I265653 B | 11/2006 |
| TW | I344229 B | 6/2011 |
| TW | I390785 B1 | 3/2013 |
| TW | 201330360 A1 | 7/2013 |
| TW | 201336142 A1 | 9/2013 |
| WO | WO 2006/078103 A1 | 7/2006 |
| WO | WO 2013/019066 A2 | 2/2013 |

OTHER PUBLICATIONS

International Search Report issued in PCT/KR2014/006415, dated Oct. 20, 2014.

* cited by examiner

[FIG. 1]
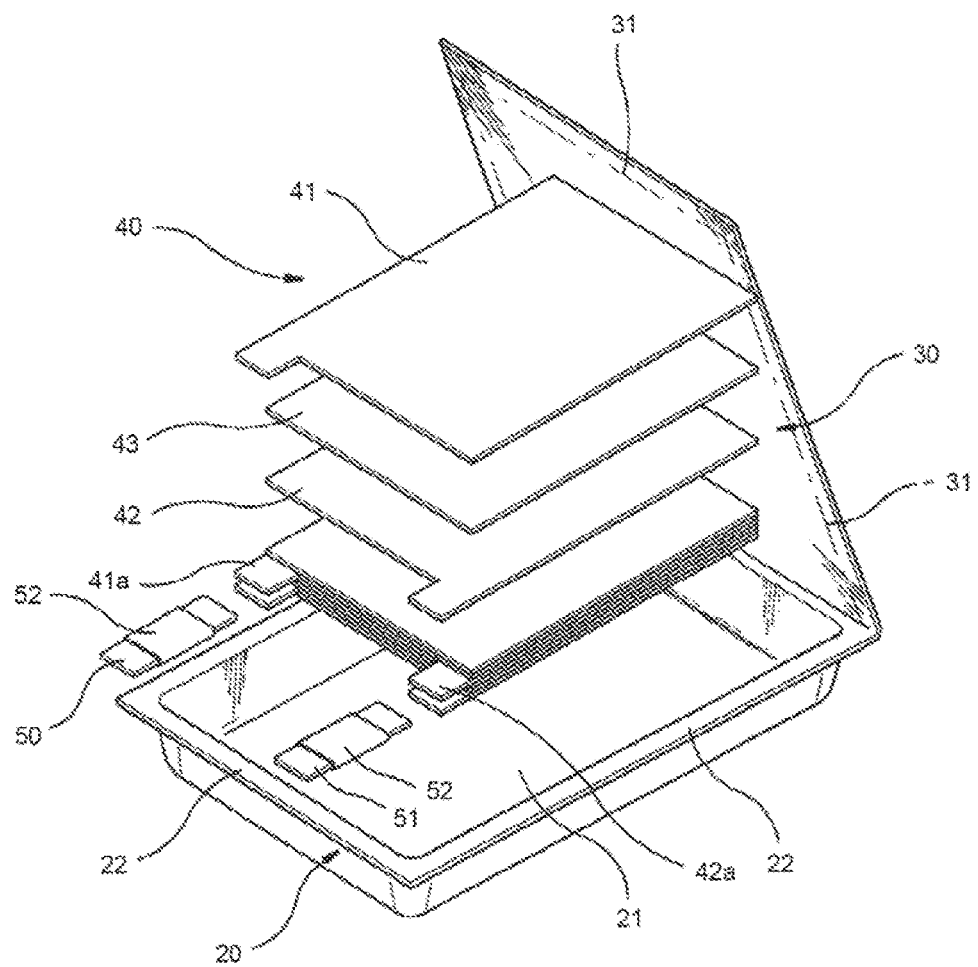

[FIG. 2]
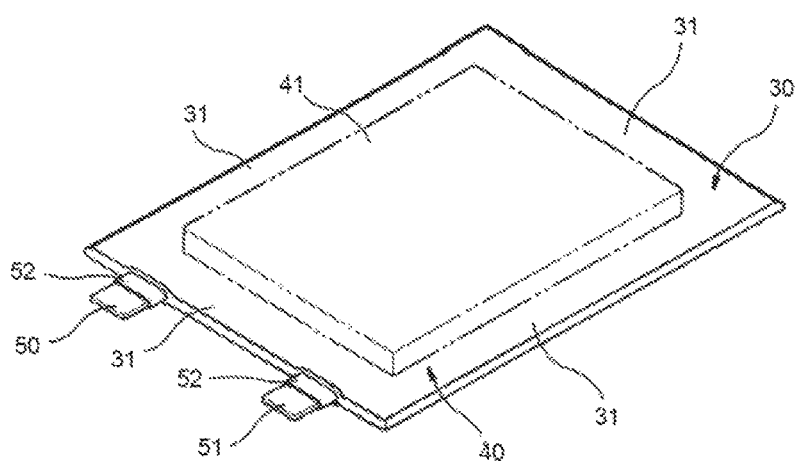
[FIG. 3]
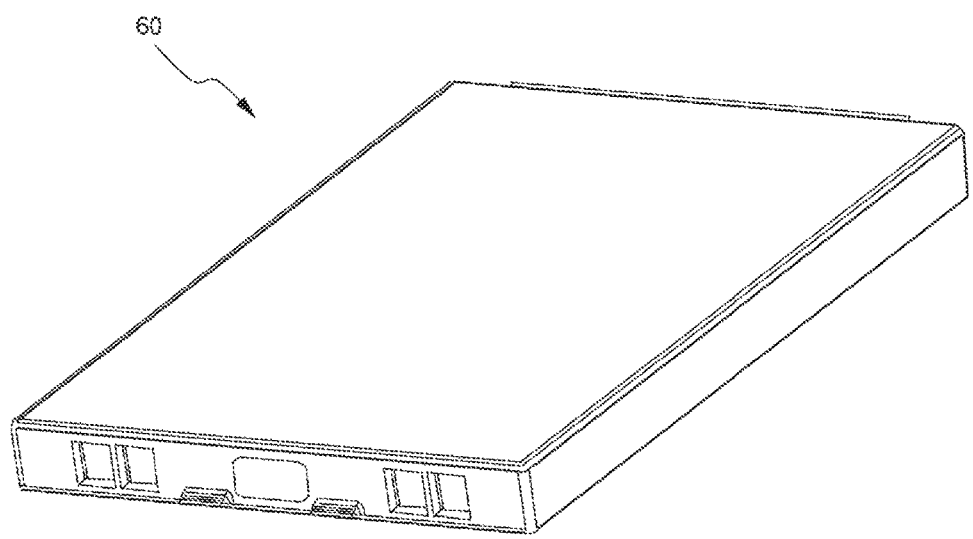

【FIG. 4】
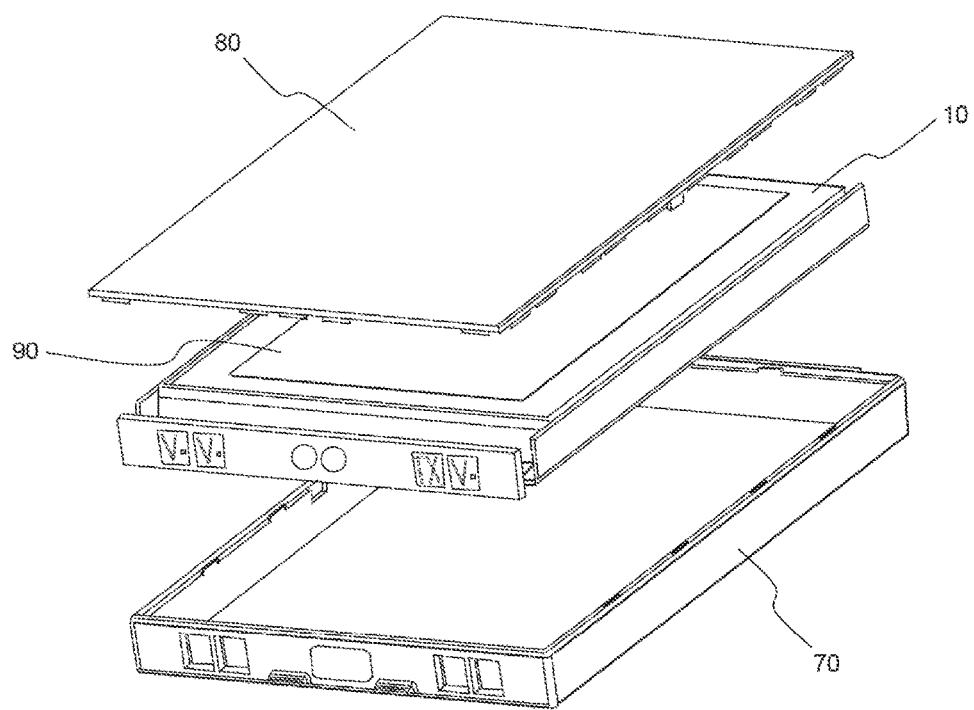

[FIG. 5]
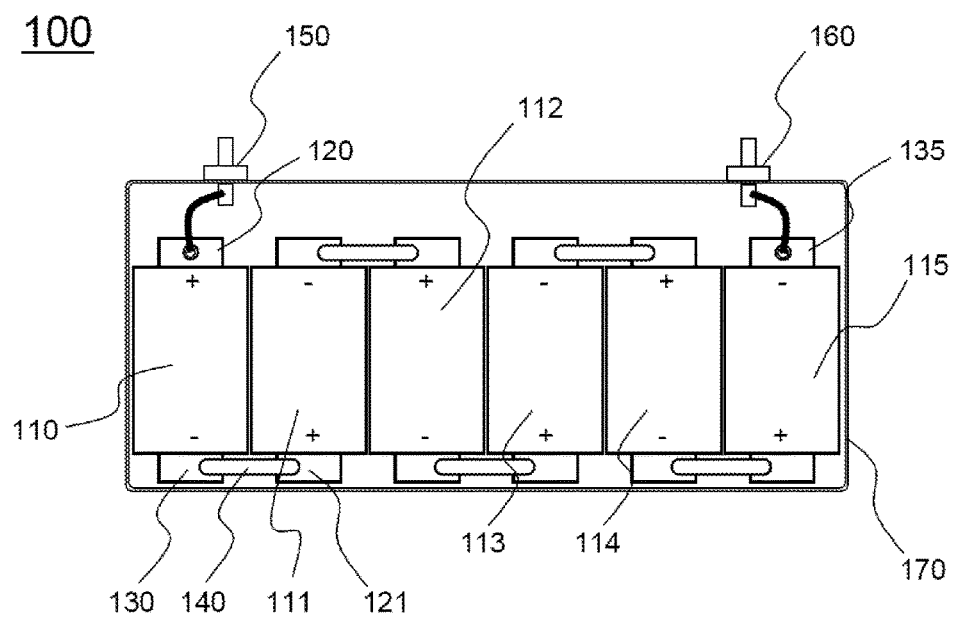

[FIG. 6]
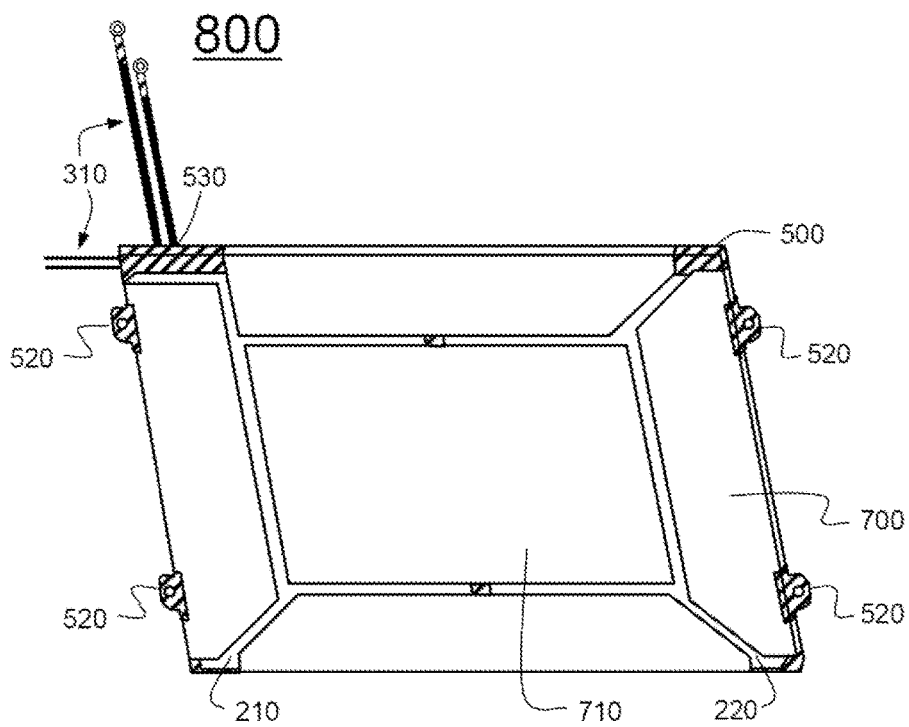

【FIG. 7】
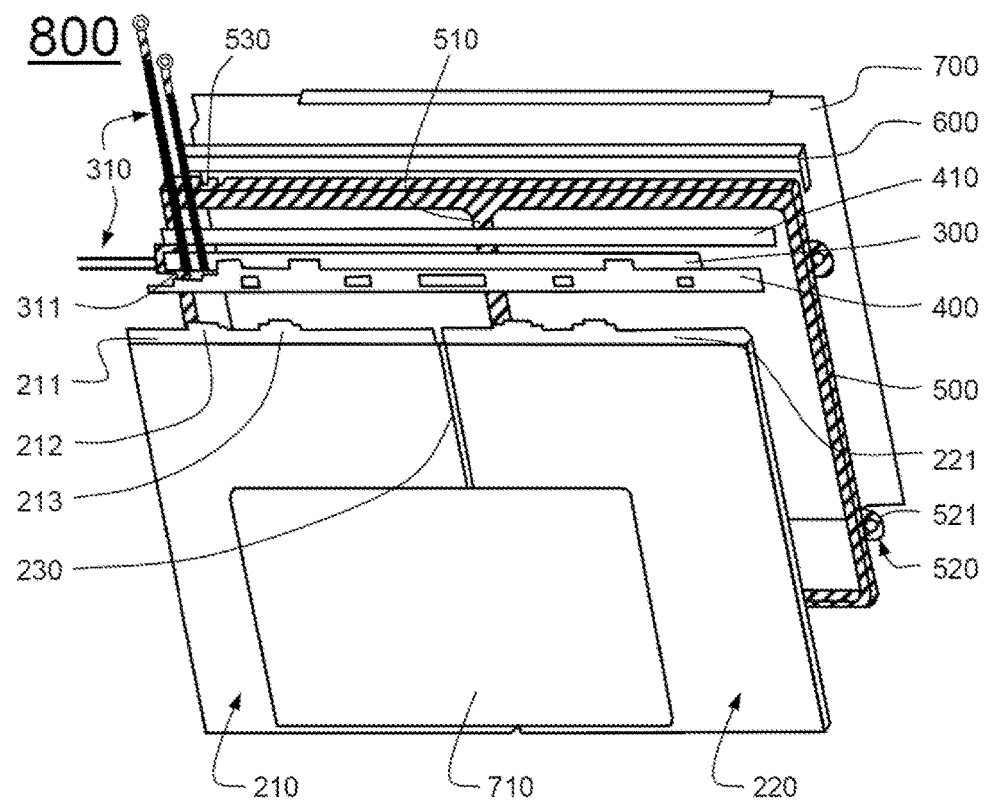
【FIG. 8】
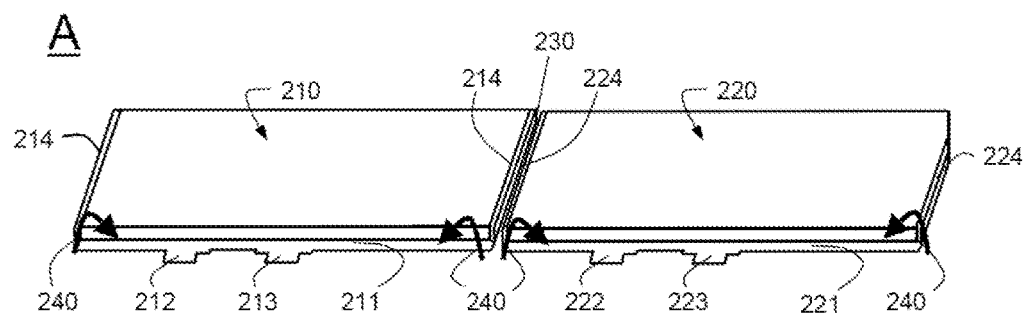

[FIG. 9]
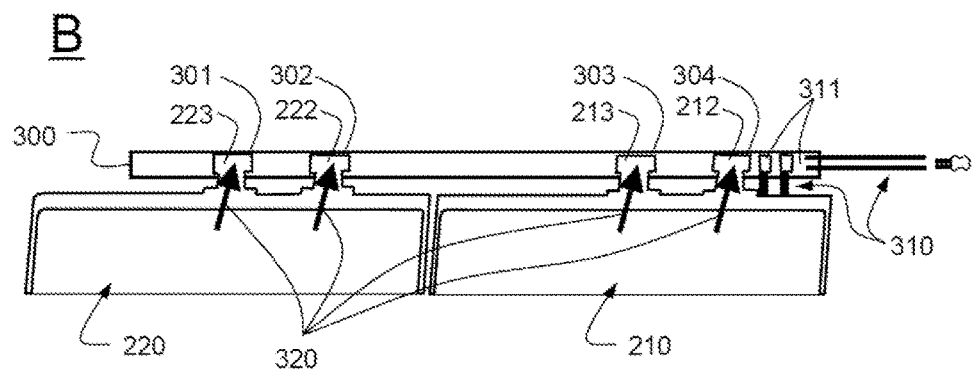
[FIG. 10]
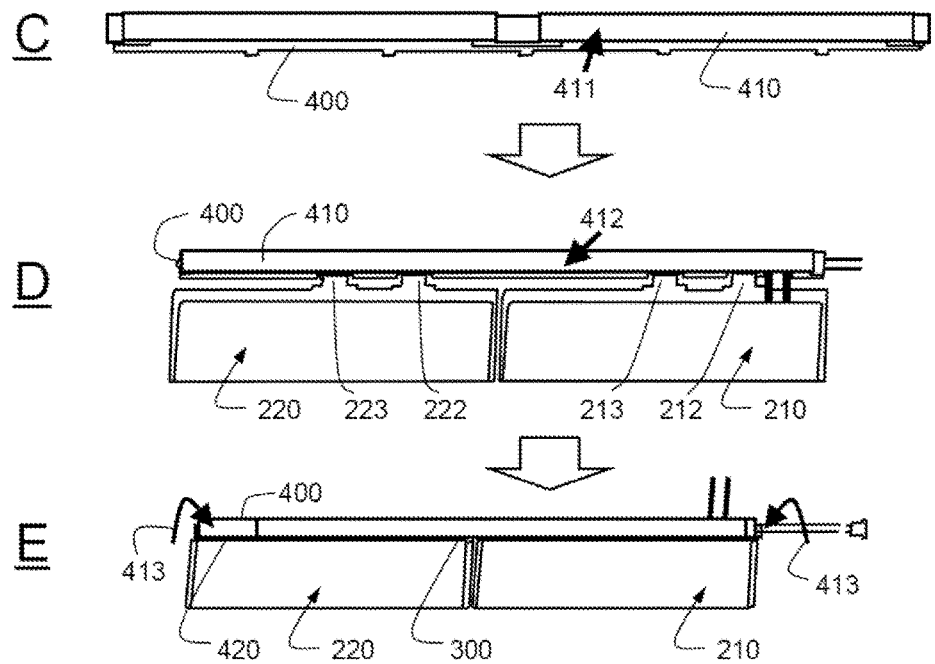

[FIG. 11]
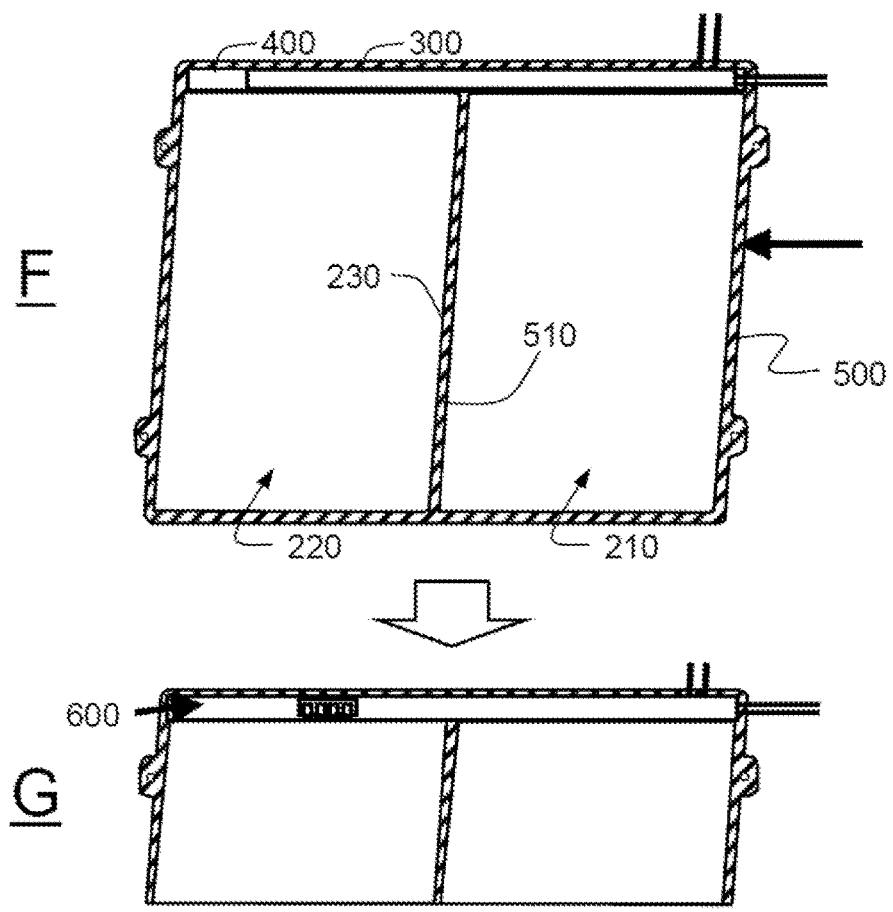

[FIG. 12]
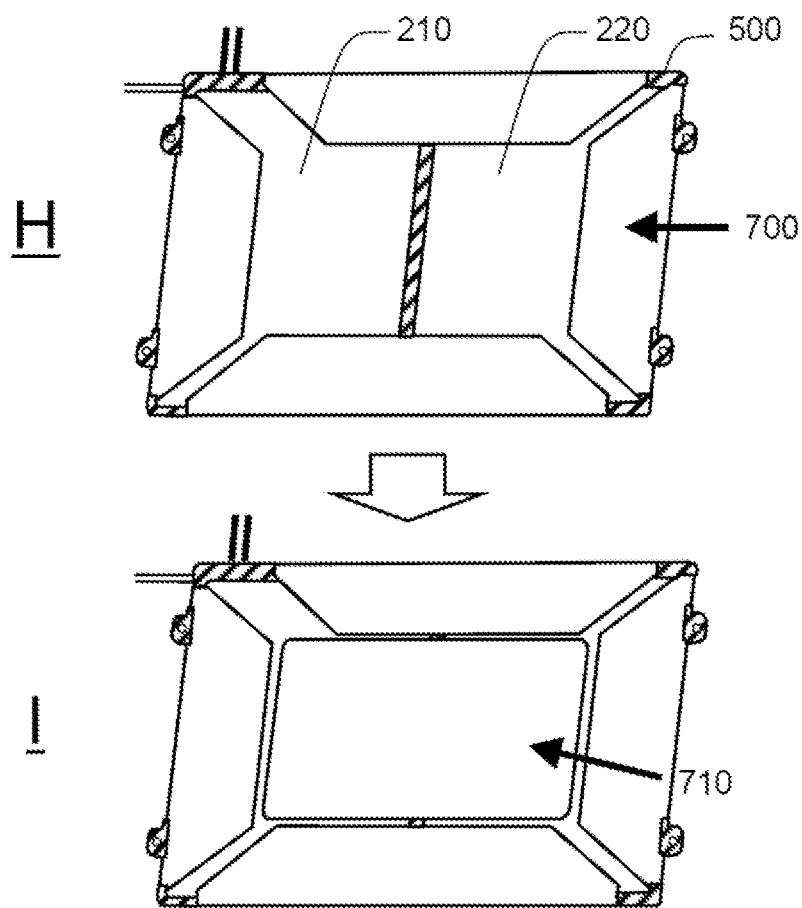

BATTERY PACK HAVING ELECTRIC INSULATING MEMBER

TECHNICAL FIELD

The present invention relates to a battery pack including an electrically insulative member and, more particularly, to a battery pack including two or more plate-shaped battery cells arranged in plane, a pack frame including two or more battery cell receiving parts, a protection circuit module (PCM) to control operation of the battery pack, a middle mold loaded on sealed surplus portions, an electrically insulative member, and a label.

BACKGROUND ART

Based on the appearance thereof, a secondary battery may be generally classified as a cylindrical battery, a prismatic battery, or a pouch-shaped battery. A recent trend in the miniaturization of mobile devices has increased the demand for a prismatic battery or a pouch-shaped battery, which has a small thickness. An exploded perspective view of a pouch-shaped battery and a perspective view of an assembled state of the pouch-shaped battery are typically shown in FIGS. 1 and 2, respectively.

Referring to FIGS. 1 and 2, a pouch-shaped battery 10 includes a pouch-shaped case 20 having an inner space 21 of a predetermined size, a cover 30 hingedly connected to the pouch-shaped case 20, an electrode assembly 40 mounted in a receiving part 21 of the pouch-shaped case 20, the electrode assembly 40 including cathode plates 41, anode plates 42, and separators 43, electrode tabs 41a and 42a extending ends of the cathode plates 41 and the anode plates 42 of the electrode assembly 40, respectively, and electrode terminals 50 and 51 connected to the electrode tabs 41a and 42a, respectively.

A side extension part 22 of a predetermined width for thermal bonding is formed at an upper edge of the receiving part 21 of the pouch-shaped case 20. Middle portions of the electrode terminals 50 and 51 respectively connected to the electrode tabs 41a and 42a are coated with terminal tapes 52 made of an insulative material to prevent the occurrence of a short circuit between the electrode terminals 50 and 51 when the side extension part 22 of the pouch-shaped case 20 is thermally bonded to a side part 31 of the cover 30 using a thermal bonding device (not shown).

The conventional pouch-shaped battery with the above-stated construction is manufactured as follows.

First, the electrode assembly 40 including the cathode plates 41, the anode plates 42, and the separators 43 is mounted in the receiving part 21 of the pouch-shaped case 20 and then a predetermined amount of an electrolyte is injected into the inner space of the pouch-shaped case 20. At this time, the electrode tabs 41a and 42a of the electrode assembly 40 are respectively connected to the electrode terminals 50 and 51, the middle portions of which are coated with the terminal tapes 52. The electrode terminals 50 and 51 and the terminal tapes 52 partially protrude outward from the pouch-shaped case 20 and the cover 30.

Subsequently, the cover 30 is brought into tight contact with the pouch-shaped case 20 and then the side extension part 22 of the pouch-shaped case 20 is thermally bonded to the side part 31 of the cover 30 using the thermal bonding device (not shown) such that the electrolyte does not leak from the pouch-shaped case 20.

The shape of a representative battery pack having the pouch-shaped battery with the above-stated construction mounted therein is shown in FIG. 3 and a separated state of the battery pack before being assembled is typically shown in FIG. 4.

Referring to FIGS. 3 and 4, a battery pack 60 includes a rectangular battery 10 having an electrode assembly including cathodes, anodes, and separators received therein together with an electrolyte in a sealed state, a case body 70 having an inner space to receive the battery 10, and an upper cover 80 coupled to the case body 70, in which the battery 10 is received, to seal the battery 10. Between the case body 70 and the battery 10 and between the upper cover 80 and the battery 10 are attached double-sided adhesive tapes 90.

In general, the battery pack 60 with the above-stated construction is assembled by coupling the upper cover 80 to the case body 70, which is made of a plastic material, such as polycarbonate (PC) or acrylonitrile-butadiene-styrene (ABS), using an ultrasonic welding method. The ultrasonic welding method is a method of thermally bonding two surfaces using a frictional heat generated due to vibration based on a high frequency of 20,000 Hz.

However, the demand for a battery pack having a smaller thickness has increased. In recent years, therefore, the thickness of the case body 70 and the upper cover 80 has been reduced to 0.3 to 0.35 mm. As a result, it is difficult to perform die molding and injection molding. In addition, welding strength is reduced with the result that a welding defect rate is increased.

For a battery using a can as a battery case, on the other hand, it is possible to provide proper strength against external impact due to structural characteristics of the can even in a case in which the thickness of the battery case is small. However, the pouch-shaped battery 10 having the structure shown in FIG. 1 has low strength against external impact due to structural characteristics of the pouch-shaped battery 10. For this reason, application of a case having a small thickness to the pouch-shaped battery 10 is limited.

Furthermore, when external impact is applied to the battery pack 60, the battery 10 may move upward and downward in the inner space defined between the case body 70 and the upper cover 80 although the battery 10 is coupled to the case body 70 and the upper cover 80 using the double-sided adhesive tape 90 with the result that a short circuit or a cut off may occur in the battery pack 60.

Consequently, there is a high necessity for a battery pack that can be easily manufactured, has proper strength against external impact while using a case having a small thickness, and exhibits excellent safety against a short circuit or a cut off.

Meanwhile, depending upon kinds of external devices in which secondary batteries are used, the secondary batteries may be used in the form of a single battery or in the form of a battery pack having a plurality of unit cells electrically connected to each other. For example, small-sized devices, such as a mobile phone, can be operated for a predetermined period of time with the power and capacity of one battery. On the other hand, a battery pack having a plurality of batteries mounted therein needs to be used in middle or large-sized devices, such as a laptop computer, a tablet computer, a small-sized personal computer (PC), an electric vehicle, and a hybrid electric vehicle, because high power and large capacity are necessary for the middle or large-sized devices.

A lithium secondary battery, which is one of the secondary batteries, has been widely used due to high power and large capacity thereof.

Various kinds of combustible materials are contained in the lithium secondary battery. As a result, the lithium secondary battery may be heated or explode due to the overcharge of the battery, the overcurrent in the battery, or other external physical impact against the battery. That is, the safety of the lithium secondary battery is very low. For this reason, safety elements, such as a positive temperature coefficient (PTC) element and a protection circuit module (PCM), which are capable of effectively controlling an abnormal state of the lithium secondary battery, such as the overcharge of the lithium secondary battery or the overcurrent in the lithium secondary battery, are loaded on a battery cell of the lithium secondary battery while being connected to a battery cell of the lithium secondary battery.

As described above, small-sized mobile devices use one or several battery cells for each device. On the other hand, middle or large-sized devices, such vehicles, use a middle or large-sized battery module having a plurality of battery cells electrically connected with each other because high power and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

In general, a plurality of unit cells is mounted in a cartridge in a state in which the unit cells are connected in series or in parallel to each other and a plurality of cartridges is electrically connected to manufacture a battery pack.

Series connection of unit cells in a conventional high power, large capacity battery pack is typically shown in FIG. 5.

Referring to FIG. 5, each unit cell is configured to have a structure in which a cathode, an anode, and a separator are provided in a case together with an electrolyte in a sealed state and a cathode tab 120 and an anode tab 130 protrude from upper and lower ends of the case. In a case in which a first unit cell 110 is disposed such that a cathode tab 120 is located at the upper end thereof, a second unit cell 111 disposed adjacent to the first unit cell 110 is disposed such that a cathode tab 121 is located at the lower end thereof. Opposite electrodes of the unit cells 110 and 111 are electrically connected to each other via an electrode lead 140 in a state in which the opposite electrodes of the unit cells 110 and 111 are adjacent to each other. A third unit cell 112 is connected in series to the second unit cell 111 in the same manner as connection between the first unit cell 110 and the second unit cell 111. Although not shown in FIG. 5, a first battery group of FIG. 5 including a plurality of unit cells connected in series to each other as described above is connected in parallel to a second battery group including a plurality of unit cells connected in the same manner as in the first battery group.

The battery groups, which are connected in parallel to each other as described above, are mounted in a housing 170 in a state in which the cathode tab 120 of the first unit cell 110 of each of the battery groups is connected to a cathode external terminal 150 and an anode tab 133 of a last unit cell 115 of each of the battery groups is connected to an anode external terminal 160. As shown in FIG. 5, the electrode tabs 120 and 130 are formed in a major axis direction of the unit cell 110. According to circumstances, however, the electrode tabs 120 and 130 may be formed in a minor axis direction of the unit cell 110.

In the battery pack including the unit cells 110, 111, 112, 113, 114, and 115, which are electrically connected to each other, however, the unit cells 110, 111, 112, 113, 114, and 115 have the same size or capacity. In order to reduce weight and thickness of the battery pack in consideration of design of a device to which the battery pack is applied, therefore, it is necessary to reduce the capacity of the battery pack. Alternatively, it is necessary to change the design of the device such that the size of the device can be increased. During a design changing process, however, electrical connection between the unit cells is complicated with the result that it is difficult to manufacture a battery pack satisfying desired conditions.

Consequently, there is a high necessity for a battery pack that is capable of solving the above-mentioned problems.

DISCLOSURE

Technical Problem

Therefore, the present invention has been made to solve the above problems, and other technical problems that have yet to be resolved.

It is an object of the present invention to provide a battery pack configured to have a structure in which a plurality of battery cells is received in the battery pack in a state in which the battery cells are electrically connected to each other in a specific manner such that the battery pack can be applied based on the shape of a device to which the battery pack is applied while retaining the capacity of the battery pack through connection of unit cells.

It is another object of the present invention to provide a battery pack configured to have a structure in which battery cells and a pack frame are fixed using a specific material such that the battery pack exhibits proper strength against external impact and excellent safety against a short circuit or a cut off while using a case having a small thickness.

Technical Solution

In accordance with one aspect of the present invention, the above and other objects can be accomplished by the provision of a battery pack including two or more plate-shaped battery cells having anode terminals and cathode terminals formed at one sides thereof including sealed surplus portions, the battery cells being arranged in plane such that the electrode terminals of the battery cells are aligned in one direction, a pack frame including two or more battery cell receiving parts surrounding outer circumferences of the battery cells in a state in which upper and lower surfaces of the battery cells arranged in plane are opened, a protection circuit module (PCM) electrically connected to the electrode terminals of the battery cells aligned in one direction to control operation of the battery pack, a middle mold to receive the PCM, the middle mold being loaded on the sealed surplus portions, an electrically insulative member applied into a space defined by the sealed surplus portions and the pack frame and onto the middle mold and the PCM such that the middle mold and the PCM are integrated with the pack frame, and a label to cover the battery cells, the pack frame, and the electrically insulative member.

In the battery pack according to the present invention, it is possible to locate and fix the battery cells in the pack frame without using an ultrasonic welding method. Consequently, the size or the structure of the case is not greatly limited. In addition, movement of the battery cells in an inner space of the case is restrained, thereby preventing the occurrence of a short circuit or a cut off due to external impact.

In addition, the battery cells may be combined based on the shape of a device to which the battery pack is applied to constitute the battery pack, whereby the battery pack can be flexibly applied to various shapes of the device while providing high capacity.

In a concrete example, the pack frame is not particularly restricted so long as the pack frame is formed in a shape that is capable of covering sides of the battery cells while having an inner space to receive the battery cells. For example, the pack frame is a frame-shaped member that covers only the sides of the battery cells.

In addition, the material for the pack frame is not particularly restricted so long as the material for the pack frame can protect the battery cells mounted in the pack frame. For example, the material for the pack frame may be a plastic material, such as polycarbonate (PC) or acrylonitrile-butadiene-styrene (ABS), or a metal material, such as stainless steel (SUS).

For example, each of the plate-shaped battery cells may be a prismatic secondary battery or a pouch-shaped secondary battery.

The prismatic secondary battery may be configured to have a structure in which an electrode assembly is received in a prismatic metal case in a sealed state and the pouch-shaped secondary battery may be configured to have a structure in which an electrode assembly is received in a battery case made of a laminate sheet including a metal layer and a resin layer in a sealed state.

The secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

In the battery pack according to the present invention, two plate-shaped battery cells may be arranged in plane such that the electrode terminals of the battery cells are aligned in one direction.

In addition, the battery cells may be electrically connected in parallel or in series to each other via the PCM.

In the battery pack according to the present invention, the pack frame may have a thickness approximately corresponding to the thickness of one of the battery cells due to the plane arrangement of the battery cells as described above. For example, the pack frame may have a thickness equal to a thickness of each of the battery cells or 1 to 10% greater than the thickness of each of the battery cells.

The pack frame may include a battery cell partition wall disposed between adjacent sides of the battery cells to prevent movement of the battery cells received in the pack frame. In addition, the partition wall may be integrally formed with the pack frame. Since the partition wall is disposed between the adjacent sides of the battery cells, therefore, it is possible to more securely and stably fix the battery cells received in the pack frame. In addition, the partition wall has a size corresponding to outer dimensions of each of the battery cells. Consequently, it is possible to simplify an assembly process of mounting the battery cells in the pack frame.

In a concrete example, the pack frame may be provided at at least one side thereof with one or more fastening parts protruding outward in a direction parallel to the plane arrangement direction of the plate-shaped battery cells.

The fastening parts may function as fastening fixing members to more securely and stably fix the pack frame to a device to which the battery pack is applied. For example, the fastening parts may be fastened to the device to which the battery pack is applied using bolts and nuts. Alternatively, the fastening parts may be fastened to the device to which the battery pack is applied through a rivet or hook structure. Consequently, safety of the battery cells received in the pack frame is guaranteed even after the battery pack is applied to the device.

In another concrete example, the pack frame may be provided at at least one side thereof with one or more openings, through which a bus bar or a wire extends outward from the PCM. The openings may be formed at any portions of the sides of the pack frame. For example, the openings may be formed at portions of the sides of the pack frame adjacent to the sealed surplus portions of the battery cells.

The bus bar or the wire extends from a PCM connection terminal part and is electrically connected to an external connection terminal part, i.e. a circuit of an external device. The bus bar or the wire may function as an electrical conduction member to charge and discharge and sense the battery cells received in the pack frame.

The PCM may be configured to have various forms. For example, the PCM may be a printed circuit board (PCB) having a protection circuit printed thereon.

In a concrete example, the battery pack may have a structure including one PCM electrically connected to the electrode terminals of the battery cells received in the pack frame and loaded on the sealed surplus portions of the battery cells.

Specifically, several battery cells received in the pack frame may be electrically connected to one PCM and the PCM may be loaded on the sealed surplus portions of the battery cells. Consequently, the battery pack according to the present invention has a more compact structure than a conventional battery pack. In addition, since only one PCM is applied, electric wiring may be simplified as compared with the conventional battery pack.

The PCM may be individually loaded on the sealed surplus portions of the battery cells. Preferably, however, the PCM is loaded on the sealed surplus portions of the battery cells after the PCM is mounted in the middle mold. Specifically, the size of the middle mold is not particularly restricted so long as the middle mold has a shape and a size corresponding to the sealed surplus portions of the battery cells. For example, the middle mold may have a length corresponding to widths of the sealed surplus portions of all the battery cells received in the pack frame.

Since the PCM is protected from external impact due to the middle mold and is mounted in the middle mold having a shape and a size corresponding to the sealed surplus portions of the battery cells, therefore, the PCM may be more stably and securely loaded on the sealed surplus portions of the battery cells.

When the middle mold, in which the PCM is mounted, is loaded on the sealed surplus portions of the battery cells, an insulating tape may be further attached between the sealed surplus portions and the middle mold. For example, the insulating tape may be a double-sided adhesive tape.

Consequently, the PCM may be stably and securely loaded on the sealed surplus portions of the battery cells and a short circuit between the circuit devices mounted on the PCM and the sealed surplus portions of the battery cells may be prevented due to characteristics of the insulating tape.

Each of the battery cells may be a pouch-shaped battery which is manufactured to have small weight and thickness although mechanical strength is low. Preferably, each of the battery cells is a lithium ion polymer battery having a low possibility of leakage.

Meanwhile, when the pouch-shaped batteries are located in the inner space of the pack frame, an empty space is formed between the pouch-shaped batteries and the inside of the upper end of the pack frame due to the electrode terminals mounted or coupled to the upper ends of the pouch-shaped batteries, the PCM, the insulating member, etc. The upper ends of the batteries are relatively weak. When the battery pack falls or external impact is applied to the battery pack, therefore, the batteries may be easily deformed with the result that the batteries may have defects. For example, when the batteries moves toward the upper end of the inner space of the pack frame due to falling of the battery pack or external impact applied to the battery pack, a short circuit may occur due to electric contact between the devices. On the other hand, when the batteries moves toward the lower end of the inner space of the pack frame, electrical connection between the devices located at the upper ends of the batteries may be cut off.

One of the characteristics of the present invention is that the insulative member functioning to absorb a shock due to falling of the battery pack and external impact applied to the battery pack and to retain electrical connection between the devices located at the upper ends of the batteries is applied into the inner space defined by the sealed surplus portions and the pack frame and onto the middle mold and the protection circuit module.

The insulative member may be made of a material which is thermally melted, applied into a space defined by the sealed surplus portions and the pack frame and onto the middle mold and the protection circuit module, and solidified. In a concrete example, the material may be a plastic resin. However, the present invention is not limited thereto. The plastic resin may be a thermoplastic resin, a melting point of which is within a temperature range in which deformation of devices located at an inside of an upper end of the pack frame and PCM is not caused. According to circumstances, however, the insulative member may be made of a material which is applied into a space defined by the sealed surplus portions and the pack frame and onto the middle mold and the PCM and then solidified by chemical reaction or physical reaction. The chemical reaction may be a reaction in which a material is solidified due to hardening based on heat, light (visible light, ultraviolet light, etc.), a catalyst, etc. The physical reaction may be a reaction in which a material is solidified due to evaporation of a solvent.

According to circumstances, the insulative member may be further applied into another space defined by outsides of the battery cells and an inside of the pack frame.

In accordance with another aspect of the present invention, there is provided a method of manufacturing the battery pack with the above-stated construction. The method of manufacturing the battery pack according to the present invention includes (a) arranging battery cells in plane such that electrode terminals of the battery cells are aligned in one direction, (b) connecting the electrode terminals of the battery cells to a PCM by welding, (c) mounting a middle mold to the PCM, (d) loading the middle mold on sealed surplus portions of the battery cells, (e) mounting the battery cells in a pack frame, (f) applying an electrically insulative member to the middle mold and the PCM, and (g) attaching a label to the pack frame having the battery cells mounted therein.

In a concrete example, the welding is not particularly restricted so long as electrical connection between the electrode terminals of the battery cells and the PCM is achieved. Preferably, the welding is spot welding.

In accordance with a further aspect of the present invention, there is provided a mobile device including the battery pack with the above-stated construction as a power source.

A concrete example of the mobile device in which the battery pack according to the present invention is used may be a laptop computer, a netbook computer, a tablet PC, or a smart pad.

The mobile device requires a battery pack having a large capacity to size ratio and a small thickness in consideration of a recent trend in which it is possible to use the mobile device for a long period of time when the battery pack is charged once and the mobile device is required to be light, thin, short, and small. However, it is difficult for an inner space of a mobile device in which the battery pack simultaneously satisfying the above requirements is mounted to have a fixed size, for example a standardized rectangular parallelepiped shape unlike conventional mobile devices. That is, for a mobile device having a small thickness, a space of the mobile device in which the battery pack will be mounted is greatly limited and cannot be easily standardized due to installation positions of components constituting the mobile device. In the battery pack according to the present invention, on the other hand, arrangement of the battery cells is very flexible based on battery groups having various sizes and capacities and, therefore, it is possible to solve the above-mentioned problems once and for all.

The above-described devices and apparatuses are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a general pouch-shaped battery;

FIG. 2 is a perspective view showing an assembled state of the pouch-shaped battery of FIG. 1;

FIG. 3 is a perspective view showing a conventional battery pack having a pouch-shaped battery mounted therein;

FIG. 4 is an exploded perspective view showing the battery pack of FIG. 3;

FIG. 5 is a perspective view showing a cartridge in which conventional four unit cells are mounted;

FIG. 6 is a perspective view showing a battery pack according to an embodiment of the present invention;

FIG. 7 is an exploded perspective of the battery pack shown in FIG. 6; and

FIGS. 8 to 12 are typical views showing a process of manufacturing a battery pack according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 6 is a perspective view showing a battery pack according to an embodiment of the present invention and FIG. 7 is an exploded perspective of the battery pack shown in FIG. 6.

Referring first to FIG. 6, a battery pack 800 is configured to have a structure in which two battery cells 210 and 220 are received in a pack frame 500, a label 700 covers four sides of the pack frame 500 and portions of the two battery cells 210 and 220, and a barcode label 710 is further attached to upper surfaces of the battery cells 210 and 220 which are not covered by the label 700.

In addition, four fastening parts 520 are formed at opposite sides of the pack frame 500 such that the fastening parts 520 protrude outward in a direction parallel to a plane arrangement direction of the battery cells 210 and 220 received in the pack frame 500. An opening 530, through which wires 310 functioning as an external input and output terminal extend outward, is formed at one side of the upper end of the pack frame 500.

Referring now to FIG. 7, the battery pack 800 generally includes a total of six members (the battery cells 210 and 220, the pack frame 500, a protection circuit module (PCM) 300, a middle mold 400, a plastic resin 600, and the label 700). In addition, the battery pack 800 further includes two members (an insulating tape 410 and the barcode label 710).

Specifically, the two battery cells 210 and 220 are provided at one sides thereof including sealed surplus portions 211 and 221 with anode terminals 212 and 222 and cathode terminals 213 and 223, respectively.

In addition, the pack frame 500 is configured to have a frame structure having an inner space in which the two battery cells 210 and 220 are received while covering only the sides of the battery cells 210 and 220. The fastening parts 520, including fastening holes 521, are formed at opposite sides of the pack frame 500. In addition, the pack frame 500 is provided at the middle part thereof with a partition wall 510, which is disposed and fixed between adjacent parts 230 of the battery cells 210 and 220 when the battery cells 210 and 220 are received in the pack frame 500.

In addition, the wires 310, extending outward in a state in which the wires 310 are connected to an external input and output terminal part 311 of the PCM 300, are formed at one side of the PCM 300.

Meanwhile, the plastic resin 600 shown in FIG. 7 is simply spread for easy understanding of the components of the battery pack 800. Actually, however, the plastic resin 600 is integrated into the pack frame 500 together with the PCM 300 and the middle mold 400.

Specifically, after, the battery cells 210 and 220 are mounted in the pack frame 500 together with the PCM 300 and the middle mold 400, the plastic resin 600 is thermally melted, applied into a space defined by the sealed surplus portions 211 and 221 of the battery cells 210 and 220 and the pack frame 500 and onto the middle mold 400 and the PCM 300, and solidified.

FIGS. 8 to 12 are typical views showing a process of manufacturing a battery pack according to an embodiment of the present invention.

Referring to these drawings, at a first step A, battery cells 210 and 220 are arranged in plane in a state in which corresponding sides (adjacent parts) 230 of the battery cells 210 and 220 are in contact with each other such that sealed surplus portions 214 and 224 formed at opposite sides of the battery cells 210 and 220 are bent (see reference numeral 240) upward and then electrode terminals 212, 213, 222, and 223 are aligned in one direction.

At a second step B, a PCM 300, to an external input and output terminal part 311 of which wires 310 functioning as external input and outpour terminals are connected, is connected to the battery cells 210 and 220. Specifically, the electrode terminals 212, 213, 222, and 223 of the battery cells 210 and 220 are respectively connected to the terminal connection parts 301, 302, 303, and 304 of the PCM 300 by spot welding 320.

At a third step C, an insulating tape 410 is attached (see reference numeral 411) to a middle mold 400.

At a fourth step D, the middle mold 400, to which the insulating tape 410 is attached, is mounted on the PCM 300.

At a fifth step E, the electrode terminals 212, 213, 222, and 223 are bent (see reference numeral 413) such that the middle mold 400, in which the PCM 300 is mounted, is loaded on the sealed surplus portions of the battery cells 210 and 220. At this time, the middle mold 400 is securely loaded on the sealed surplus portions of the battery cells 210 and 220 due to the insulating tape 410, which also functions as a double-sided adhesive tape.

At a sixth step F, the battery cells 210 and 220 are mounted in a pack frame 500 together with the PCM 300 and the middle mold 400. At this time, a partition wall 510 formed at the middle part of the pack frame 500 is disposed between the adjacent parts 230 of the battery cells 210 and 220 to securely fix the two battery cells 210 and 220.

At a seventh step G, a plastic resin 600 is thermally melted, applied into a space defined by sealed surplus portions 211 and 221 of the battery cells 210 and 220 and the pack frame 500 and onto the middle mold 400 and the PCM 300, and solidified.

At an eighth step H, a label 700 covers four sides of the pack frame 500 and portions of the two battery cells 210 and 220.

Finally, as a ninth step I, a barcode label 710 is further attached to upper surfaces of the battery cells 210 and 220 which are not covered by the label 700.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the present invention has effects in that it is possible to manufacture a battery pack having a small thickness without using an ultrasonic welding method, it is not necessary to use an accurate and high-priced ultrasonic welding machine, an assembly process of the battery pack is very simplified, and an insulative member is applied and solidified in a space defined by the upper end of a battery and the inside of the upper end of the battery pack to prevent the occurrence of a short circuit or a cut off due to movement of the battery even when the battery falls or external impact is applied to the battery.

In addition, the present invention has effects in that battery cells are combined based on the shape of a device to constitute the battery pack, whereby the battery pack can be flexibly applied to various shapes of the device while maintaining a high-capacity performance.

The invention claimed is:

1. A battery pack comprising:
   two or more plate-shaped battery cells having anode terminals and cathode terminals formed at one sides thereof comprising sealed surplus portions, the battery cells being arranged in a plane such that the electrode terminals of the battery cells are aligned in one direction;
   a pack frame comprising two or more battery cell receiving parts surrounding outer circumferences of the battery cells in a state in which upper and lower surfaces of the battery cells arranged in the plane are opened;
   a protection circuit module (PCM) electrically connected to the electrode terminals of the battery cells aligned in one direction to control operation of the battery pack;
   a middle mold to receive the PCM, the middle mold being loaded on the sealed surplus portions;
   an electrically insulative member applied into a space defined by the sealed surplus portions and the pack frame and onto the middle mold and the PCM such that the middle mold and the PCM are integrated with the pack frame; and
   a label to cover the battery cells, the pack frame, and the electrically insulative member,
   wherein the pack frame is provided at at least one side thereof with one or more fastening parts protruding outward from the at least one side in a direction parallel to upper and lower surfaces of the battery cells.

2. The battery pack according to claim 1, wherein each of the plate-shaped battery cells is a prismatic secondary battery or a pouch-shaped secondary battery.

3. The battery pack according to claim 2, wherein the pouch-shaped secondary battery is configured to have a structure in which an electrode assembly is received in a battery case made of a laminate sheet comprising a metal layer and a resin layer in a sealed state.

4. The battery pack according to claim 1, wherein each of the plate-shaped battery cells is a lithium secondary battery.

5. The battery pack according to claim 1, wherein two plate-shaped battery cells are arranged in the plane such that the electrode terminals are aligned in one direction.

6. The battery pack according to claim 1, wherein battery cells are electrically connected in parallel or in series to each other via the PCM.

7. The battery pack according to claim 1, wherein the pack frame has a thickness equal to a thickness of each of the battery cells or 10% or less greater than the thickness of each of the battery cells.

8. The battery pack according to claim 1, wherein the pack frame comprises a battery cell partition wall disposed between adjacent sides of the battery cells to prevent movement of the battery cells received in the pack frame, the partition wall being integrally formed with the pack frame.

9. The battery pack according to claim 1, wherein the pack frame is provided at at least one side thereof with one or more openings, through which a bus bar or a wire extends outward from the PCM.

10. The battery pack according to claim 9, wherein the openings are located at portions of the sides of the pack frame adjacent to the sealed surplus portions of the battery cells.

11. The battery pack according to claim 1, wherein the PCM is a printed circuit board (PCB) having a protection circuit printed thereon.

12. The battery pack according to claim 1, wherein the battery pack comprises one PCM electrically connected to the electrode terminals of the battery cells received in the pack frame and loaded on the sealed surplus portions of the battery cells.

13. The battery pack according to claim 1, wherein the middle mold has a length corresponding to widths of the sealed surplus portions of all the battery cells received in the pack frame.

14. The battery pack according to claim 1, further comprising an insulating tape attached between the sealed surplus portions and the middle mold.

15. The battery pack according to claim 14, wherein the insulating tape is a double-sided adhesive tape.

16. The battery pack according to claim 1, wherein the electrically insulative member is made of a material which is thermally melted, applied into a space defined by the sealed surplus portions and the pack frame and onto the middle mold and the PCM, and solidified.

17. The battery pack according to claim 16, wherein the material is a plastic resin.

18. The battery pack according to claim 17, wherein the plastic resin is a thermoplastic resin, a melting point of which is within a temperature range in which deformation of devices located at an inside of an upper end of the pack frame and PCM is not caused.

19. The battery pack according to claim 1, wherein the electrically insulative member is made of a material which is applied into a space defined by the sealed surplus portions and the pack frame and onto the middle mold and the PCM and then solidified by chemical reaction or physical reaction.

20. The battery pack according to claim 1, wherein the electrically insulative member is further applied into another space defined by outsides of the battery cells and an inside of the pack frame.

21. The battery pack according to claim 1, wherein the one or more fastening parts extend through the label.

22. A method of manufacturing a battery pack according to claim 1, the method comprising:
   (a) arranging battery cells in plane such that electrode terminals of the battery cells are aligned in one direction;
   (b) connecting the electrode terminals of the battery cells to a PCM by welding;
   (c) mounting a middle mold to the PCM;
   (d) loading the middle mold on sealed surplus portions of the battery cells;

(e) mounting the battery cells in a pack frame;
(f) applying an electrically insulative member to the middle mold and the PCM; and
(g) attaching a label to the pack frame having the battery cells mounted therein.

23. The method according to claim 22, wherein the welding is spot welding.

24. A mobile device comprising a battery pack according to claim 1 as a power source.

25. The mobile device according to claim 24, wherein the mobile device is a laptop computer, a netbook computer, a tablet PC, or a smart pad.

* * * * *